United States Patent
Dunne

(10) Patent No.: US 9,213,101 B2
(45) Date of Patent: Dec. 15, 2015

(54) SELF-ALIGNED AIMING SYSTEM AND TECHNIQUE FOR A LASER RANGEFINDER INCORPORATING A RETROREFLECTOR

(75) Inventor: Jeremy G. Dunne, Parker, CO (US)

(73) Assignees: Laser Technology, Inc., Centennial, CO (US); Kama-Tech (HK) Limited, Tsim Sha Tsui (HK)

(\*) Notice: Subject to any disclaimer, the term of this patent is extended or adjusted under 35 U.S.C. 154(b) by 465 days.

(21) Appl. No.: 13/615,215

(22) Filed: Sep. 13, 2012

(65) Prior Publication Data

US 2014/0071426 A1    Mar. 13, 2014

(51) Int. Cl.
*G01S 17/10* (2006.01)
*G01S 7/481* (2006.01)

(52) U.S. Cl.
CPC *G01S 17/10* (2013.01); *G01S 7/481* (2013.01)

(58) Field of Classification Search
CPC ...... G01C 15/002; G01C 3/08; G01S 7/4813; G01S 17/66
USPC ....................................................... 356/5.01
See application file for complete search history.

(56) References Cited

U.S. PATENT DOCUMENTS

| | | |
|---|---|---|
| 4,533,224 A | 8/1985 | Ou |
| 5,477,321 A | 12/1995 | Johnson |
| 5,574,552 A | 11/1996 | Dunne |
| 5,612,779 A | 3/1997 | Dunne |
| 5,652,651 A | 7/1997 | Dunne |
| 5,703,678 A | 12/1997 | Dunne |
| 5,880,821 A | 3/1999 | Dunne |
| 6,051,910 A | 4/2000 | Kaida et al. |
| 6,226,077 B1 | 5/2001 | Dunne |
| 6,445,444 B2 | 9/2002 | Dunne |
| 6,608,677 B1 | 8/2003 | Ray et al. |
| 7,207,983 B2 | 4/2007 | Hahn et al. |
| 7,301,616 B2 | 11/2007 | Foley |
| 7,667,598 B2 | 2/2010 | Yenisch et al. |
| 2001/0012104 A1 | 8/2001 | Dunne |
| 2003/0076484 A1 | 4/2003 | Bamji et al. |
| 2005/0174560 A1 | 8/2005 | Imber et al. |
| 2005/0200831 A1\* | 9/2005 | Staley et al. ............ 356/4.01 |
| 2005/0275826 A1 | 12/2005 | Ohtomo et al. |

(Continued)

FOREIGN PATENT DOCUMENTS

| | | |
|---|---|---|
| EP | 1102034 B1 | 5/2006 |
| JP | 09304055 A | 11/1997 |

(Continued)

OTHER PUBLICATIONS

PCT International Search Report and Written Opinion PCT/US2013/059023, Dec. 12, 2013, 11 pgs.

(Continued)

*Primary Examiner* — Luke Ratcliffe
(74) *Attorney, Agent, or Firm* — William J. Kubida; Peter J. Meza; Hogan Lovells US LLP

(57) ABSTRACT

A self-aligned aiming system and technique for a laser rangefinder incorporating a retroreflector. In operation, a virtual dot perceived in the laser rangefinder viewing window is inherently aligned with a visible beam projected on the target and has zero parallax by design. Even if there is a slight offset in the visual pathway of the laser rangefinder, when the virtual dot in the viewing window is placed on a specific point on the target, the visual beam is located at that same specific point.

14 Claims, 9 Drawing Sheets

(56) References Cited

U.S. PATENT DOCUMENTS

| | | |
|---|---|---|
| 2006/0285233 A1 | 12/2006 | Dunne |
| 2007/0127009 A1 | 6/2007 | Chen et al. |
| 2007/0182952 A1 | 8/2007 | Nishita et al. |
| 2008/0218743 A1* | 9/2008 | Stetten et al. ............ 356/73 |
| 2009/0046271 A1 | 2/2009 | Constantikes |
| 2010/0045966 A1 | 2/2010 | Cauquy et al. |
| 2010/0271616 A1 | 10/2010 | Suzuki et al. |
| 2011/0131824 A1 | 6/2011 | Yanobe et al. |
| 2011/0216305 A1 | 9/2011 | Hayashi et al. |
| 2011/0279808 A1 | 11/2011 | Dunne |
| 2011/0292371 A1 | 12/2011 | Chang |
| 2012/0140201 A1 | 6/2012 | Grauslys et al. |
| 2012/0262730 A1* | 10/2012 | Brown et al. ............ 356/615 |

FOREIGN PATENT DOCUMENTS

| | | |
|---|---|---|
| KR | 20070103533 A | 10/2007 |
| KR | 20090104326 A | 10/2009 |
| KR | 20090121609 A | 11/2009 |

OTHER PUBLICATIONS

PCT International Search Report and Written Opinion PCT/US2013/059037, Dec. 16, 2013, 14 pgs.

Patent Cooperation Treaty International Preliminary Report on Patentability and Written Opinion of the International Searching Authority; PCT/US2013/059032; Dated Mar. 17, 2015; 12 pages.

* cited by examiner

*300*

*320*

SELF-ALIGNED AIMING SYSTEM AND TECHNIQUE FOR A LASER RANGEFINDER INCORPORATING A RETROREFLECTOR

CROSS REFERENCE TO RELATED PATENT APPLICATIONS

The present invention is related to the subject matter disclosed in U.S. patent application Ser. No. 13/615,172 for: "System and Method for Superimposing a Virtual Aiming Mechanism with a Projected System Beam in a Compact Laser-Based Rangefinding Instrument" and Ser. No. 13/615,143 for: "System and Method for a Rangefinding Instrument Incorporating Pulse and Continuous Wave Signal Generating and Processing Techniques for Increased Distance Measurement Accuracy" both assigned to the assignees hereof and filed on even date herewith, the disclosures of which are herein specifically incorporated by this reference in their entirety.

BACKGROUND OF THE INVENTION

The present invention relates, in general, to the field of laser-based rangefinding and distance measuring instruments such as laser rangefinders and tape laser devices. More particularly, the present invention relates to a self-aligned aiming system and technique for a laser rangefinder incorporating a retroreflector.

In order to measure the distance to a target with a laser rangefinder or tape laser device, the user generally first aims a visible laser beam toward the target or object to place a visible dot on a specific point. The user then triggers the instrument to measure the distance to that point by analysis of the reflected laser energy from the target returned to the rangefinder. The distance to the target is then calculated and displayed by the rangefinder. In the case of tape lasers, the instrument is placed where the user would otherwise hold a tape measure and the dot is aimed at the point to which the tape would be extended.

In those instruments having an observation port, it is important that the virtual dot observed by the user in the rangefinder viewing window be in alignment with the visible laser beam, particularly in precision applications. Any parallax between the virtual dot and the visible laser beam can potentially introduce errors into the measurement. Conventional optical systems attempting to minimize this parallax rely on difficult and time consuming alignment of the instrument's optical components. In practice, such alignment procedures are expensive, subject to error, variation due to temperature and other environmental factors and the instrument can ultimately be rendered misaligned due to sustained usage or impacts.

SUMMARY OF THE INVENTION

Disclosed herein is a self-aligned aiming system and technique for a laser rangefinder incorporating a retroreflector. In operation, a virtual dot perceived in the laser rangefinder viewing window is inherently aligned with a visible beam projected on the target and has zero parallax by design. Even if there is a slight offset in the visual pathway of the laser rangefinder, when the virtual dot in the viewing window is placed on a specific point on the target, the visual beam is located at that same specific point. Stated another way, when the actual dot from the visible beam is placed on a specific point on a target, the virtual dot observed in the viewing window of the rangefinder observation port is perceived as being on that same specific point which is very important in precision applications.

Through the system and technique of the present invention, what is observed in the rangefinder viewing window has zero parallax and this precise alignment is maintained even though the viewing window observation port may have a slight offset to the visible beam. In practice, the system and technique of the present invention obviates complex and costly precision alignment procedures for the rangefinder optical components which processes are subject to error, temperature variations as well as subsequent misalignment due to impacts and the like.

In accordance with the present invention, no matter how the visible laser beam is steered, the alignment in the viewing port, or window, is always perfect and cannot go out of alignment. Importantly, it should be noted that the system and technique of the present invention is also applicable as a potential add-on to existing laser rangefinders incorporating a visible laser beam for designating a particular point on a target and measuring the distance thereto and can be mounted externally as well as internally to the instrument housing.

Particularly disclosed herein is a laser rangefinding instrument which comprises a laser transmitter for emitting a visible laser beam towards a point on a target, a laser detector for receiving a portion of the laser beam reflected from the target and a processor operatively coupled to the laser detector for determining a distance between the rangefinding instrument and the point on the target. A retroreflector receives at least a portion of the visible laser beam and a viewing window provides a view of the target and a representation of the point on the target from the retroreflector.

Also particularly disclosed herein is a method for a laser rangefinding instrument which comprises producing a visible laser beam directable toward a target and directing a first portion of the visible laser beam toward the target and a second portion of the visible laser beam toward a retroreflector. The second portion of the visible laser beam is redirected with the retroreflector toward an viewing window of the instrument to be superimposed on a view of the target therethrough. In a particular embodiment of the present invention disclosed herein the step of directing the first and second portions of the visible laser beam is carried out by a partial (e.g. dichroic) mirror and the step of redirecting occurs through the dichroic mirror.

Further particularly disclosed herein is an aiming system for a laser rangefinder which comprises a visible laser beam source and an associated retroreflector receiving at least a portion of the visible laser beam produced thereby. At least one visible laser beam redirecting element is associated with the retroreflector for redirecting the portion of the visible laser beam received from the retroreflector toward a viewing window of the laser rangefinder.

Still further disclosed herein is an aiming system for a distance measuring apparatus which comprises a visible laser beam source for producing a visible laser beam and a partial (e.g. dichroic) mirror having a first surface thereof for directing a first portion of the visible laser beam toward the target and a second portion toward a user as a virtual dot viewable with the target in a view port of the apparatus. In a particular embodiment of the present invention, the second portion of the visible laser beam is directed toward a retroreflector for redirection to a second opposite surface of the dichroic mirror for further redirection toward the user as the virtual dot.

Also additionally disclosed herein is a method for displaying a virtual aiming indication in a target designating device (for example, a laser rangefinder or laser tape measure), which comprises providing a source of visible laser light, directing a first portion of the visible laser light toward a target and also directing a second portion of the visible laser light to a viewing port of the target designating device.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1A:
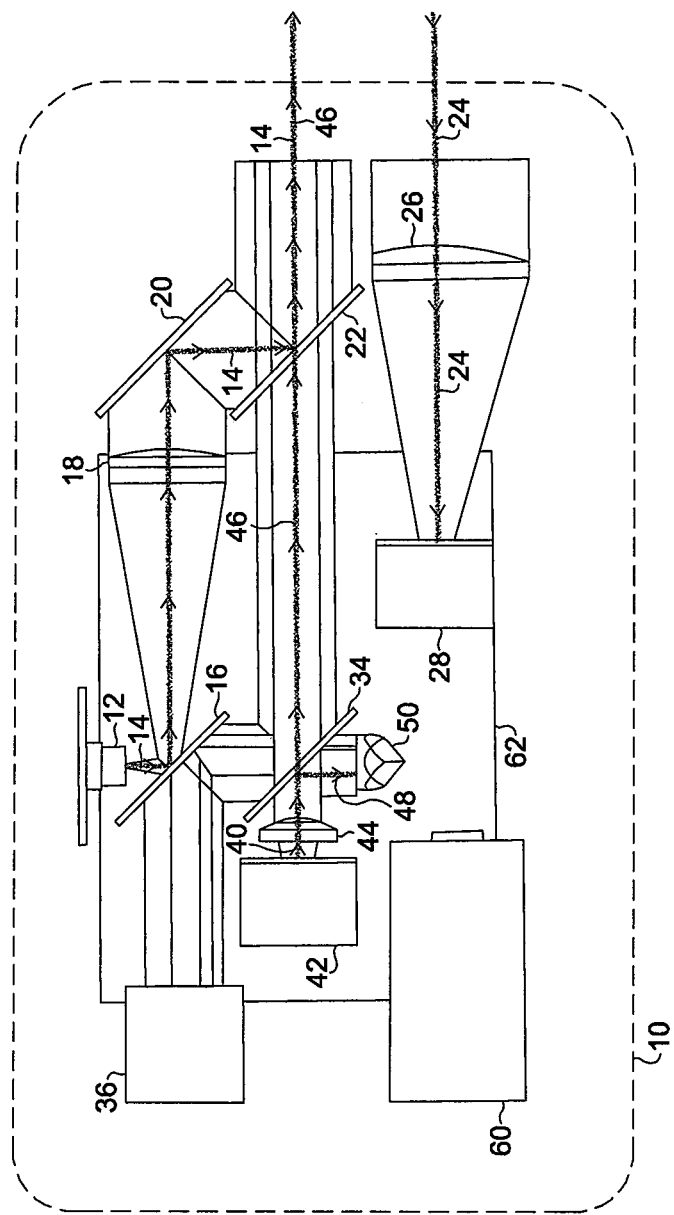
FIG. 1A is a simplified, cut-away side elevational view of a laser rangefinder in accordance with a representative embodiment of the present invention incorporating a self-aligned aiming system incorporating a retroreflector and illustrating the transmitted laser beam and reflected laser beam paths along with a visual (or visible) beam path for aiming the rangefinder at a target.
Figure 1B:
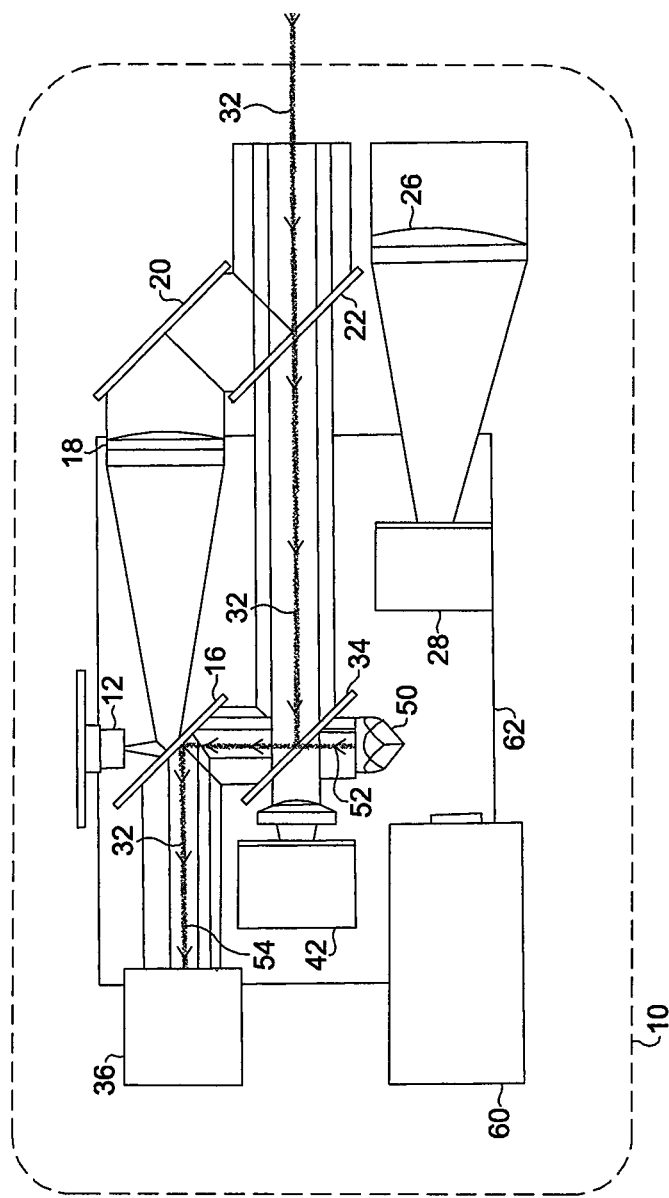
FIG. 1B is a corresponding view of the laser rangefinder of the preceding figure illustrating the path comprising the view of the target and its surrounding area as well as the visual beam placed on the target in addition to a virtual dot corresponding to the visual beam on the target provided by the retroreflector.
Figure 1C:
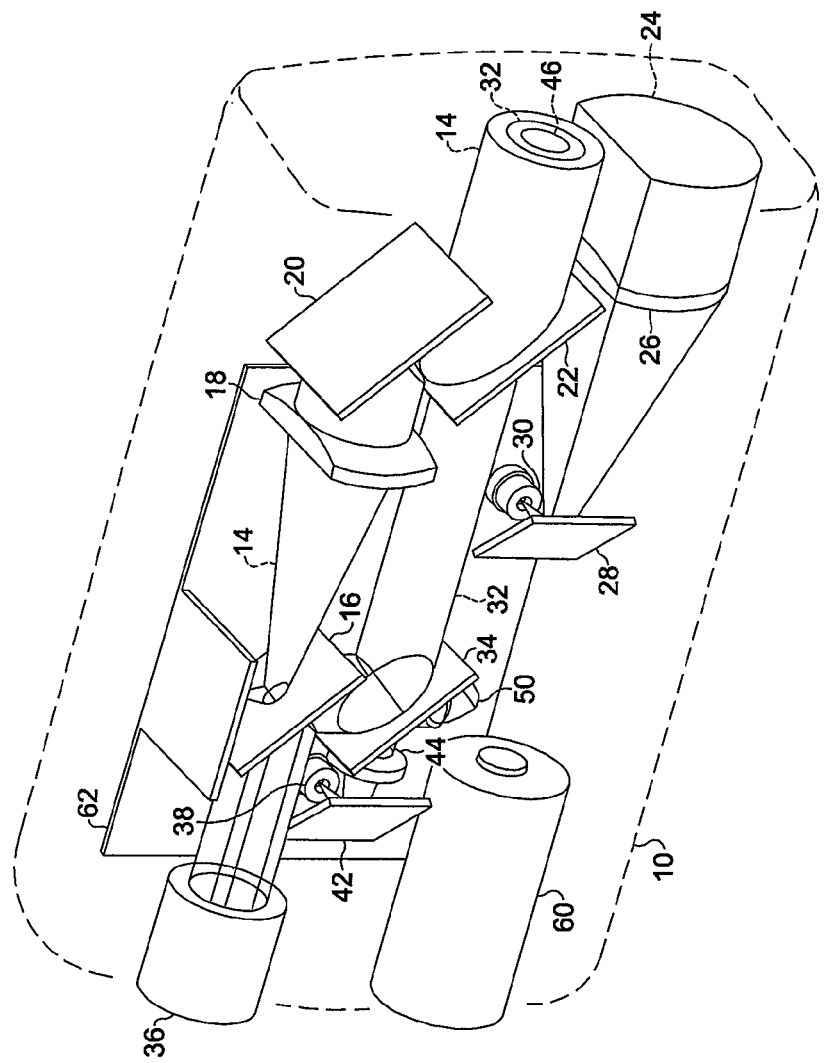
FIG. 1C is an additional simplified, cut-away isometric view of the laser rangefinder of the preceding figures further illustrative of the various components thereof.

With reference now to FIGS. 1A, 1B and 1C, simplified side elevational and isometric views of a representative embodiment of a laser rangefinder 10 in accordance with the principles of the present invention is shown.

The laser rangefinder 10 comprises a laser emitting diode 12 for producing a pulsed laser beam which is directable to a target for determining the distance thereto by computing the flight time of the pulses to, and reflected from, the target. The laser emitting diode 12 produces a laser beam 14 which, in the representative embodiment shown, is then redirected through reflection of one side of a two sided mirror 16 for direction to an objective lens system 18. The laser beam 14 is then redirected by a mirror 20 and a parallel disposed partial (e.g. dichroic) mirror 22 whereupon the laser beam 14 exits the laser rangefinder 10 to a target towards which it has been aimed.

Laser energy reflected from the target is then received back at the laser rangefinder 10 in the form of returned laser energy 24 which is focused through aspheric lens system 26 toward another mirror 28 to a laser detector 30.

In operation, a view of the target and surrounding area is viewable in the laser rangefinder 10 as indicated by visual pathway 32 which is passed through dichroic mirror 22 and redirected by means of an additional partial (e.g. dichroic) mirror 34 towards another reflective side of parallel disposed mirror 16 which may be made adjustable to correct for left/right eye parallax. The visual pathway 32 is then again redirected toward the laser rangefinder 10 viewing window 36.

In accordance with the present invention, the laser rangefinder 10 also incorporates a target designating visible laser source 38 to enable accurate pointing of the laser beam 14 toward a desired target. The visible laser source produces a visible laser beam 40 which impinges upon, and is redirected by, a mirror 42. Mirror 42 then presents the visible laser beam 14 to a focusing lens 44 which, in turn, presents the visible laser beam 14 to dichroic mirror 34. A significant portion of the visible laser beam 40 passes through the dichroic mirror 34 (e.g. substantially 90% or greater) and dichroic mirror 22 as visible laser beam 46 while a smaller portion 48 of the visible laser beam is reflected by the dichroic mirror 34 (e.g. substantially 10% or less) towards a retroreflector 50.

The retroreflector 50, such as those commercially available from Edmund Optics, Inc. Barrington, N.J., functions such that incident light is reflected back to the source, regardless of its orientation. (It should also be noted that a cat's eye retroreflector or three mutually perpendicular reflective surfaces or mirrors positioned to form the corner of a cube can be used in substitution for the retroreflector 50 as illustrated and as used herein in conjunction with the various embodiments of the present invention disclosed and described.) In this instance, the retroreflector 50 reflects a visible laser beam portion 52 back toward and through the dichroic mirror 34 to one of the reflective sides of mirror 16 and then to the viewing window 36 as visible beam 54 which is observed as a virtual dot. A user of the laser rangefinder 10 is then able to observe the target along visual pathway 32 along with the visible laser beam 46 designating a particular point on the target with the latter being visually superimposed with the virtual dot provided by the visible laser beam 54.

A battery 60 for providing operating power for the various laser rangefinder components is shown in a portable, handholdable embodiment thereof. A circuit board 62 comprises much of the electronic components necessary for the generation of the laser beam 14 and calculation of the distance to a target from its relationship to the timing of the returned laser energy 24.

Figure 2:
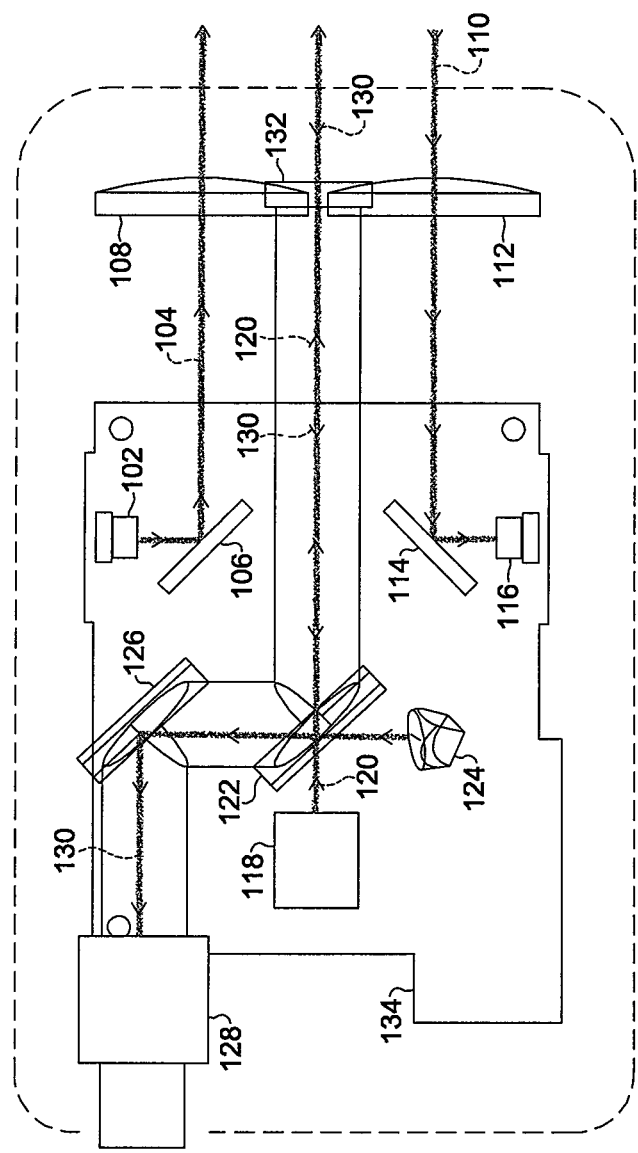
FIG. 2 is a simplified, cut-away side elevational view of another possible representative embodiment of the present invention wherein the laser emitting and detecting elements are mounted on perpendicularly to a printed circuit board and incorporating a retroreflector in accordance with the principles of the present invention.

With reference additionally now to FIG. 2, a simplified, cut-away side elevational view of another possible representative embodiment of the present invention is shown in the form of a laser rangefinder 100. With respect to this particular embodiment, the laser emitting and detecting elements are mounted on the same side of a printed circuit board and incorporate a retroreflector in accordance with the principles of the present invention.

Laser rangefinder 100 comprises, in pertinent part, a laser emitting diode 102 for generating a laser beam 104 which is reflected by mirror 106 through a focusing lens 108 at a laser transmission aperture. Laser energy reflected from the target is then received back at the laser rangefinder 100 in the form of returned laser energy 110 through a focusing lens 112 at a laser reception aperture. A mirror 114 then redirects the returned laser energy toward a laser detector 116.

A target designating visible laser source (not shown) generates a visible laser beam 120 which is reflected by a mirror 118 toward a target. The visible laser beam 120 intersects a partial (e.g. dichroic) mirror 122 which enables a substantial portion of the visible laser beam to pass through it while reflecting a small portion toward a retroreflector 124. The retroreflector 124 than redirects the light incident upon it back toward the dichroic mirror 122 and through it to mirror 126 where this portion of the visible laser beam is redirected toward a viewing window 128 to be perceived as a virtual dot. This virtual dot, along with a view of the target and surrounding area is received on visual pathway 130 through an aperture 132. In the particular embodiment shown, the laser emitting diode 102, the laser detector 116 and the visible laser source may all be mounted on the same circuit board 134 along with other electronic components and structural elements.

With reference additionally now to FIGS. 3A through 3E inclusive, simplified, cut-away side elevational views of the adaption of a self-aligned aiming system incorporating a retroreflector in accordance with the present invention are shown through the adaption of the same for external mounting to an existing laser rangefinder.

Figure 3A:
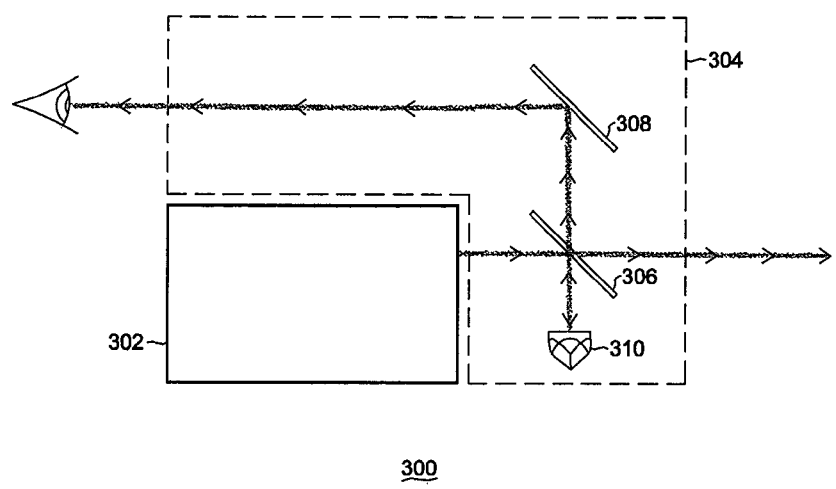
FIGS. 3A through 3E inclusively are simplified, cut-away side elevational views of the adaption of a self-aligned aiming system incorporating a retroreflector in accordance with the present invention through the adaption of the same for external mounting to an existing laser rangefinder.

With reference particularly to FIG. 3A, a system 300 is illustrated which comprises a laser rangefinder 302 in conjunction with an external self-aligned aiming system 304 which may be mounted externally to the laser rangefinder 302. The self-aligned aiming system 304 comprises a glass or partially transmissive (e.g. dichroic) element 306 and a parallel disposed mirror 308. A retroreflector 310 is associated with the dichroic element 306 for providing a virtual dot in a viewing window that is coaxial with a visible laser beam as previously described.

Figure 3B:
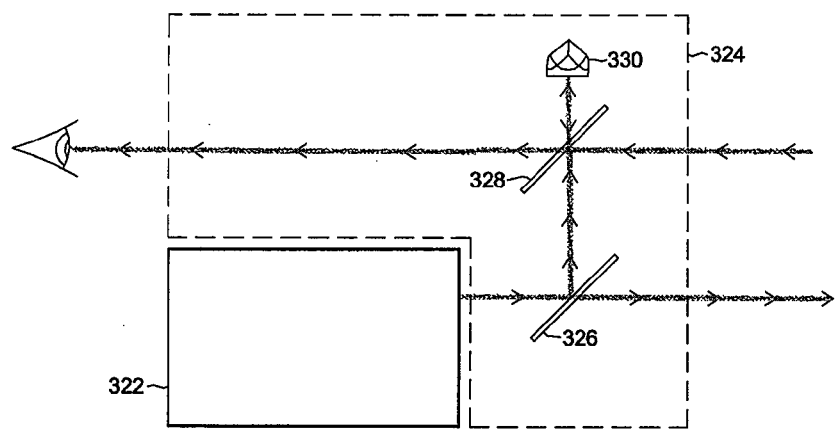
Figure 3C:
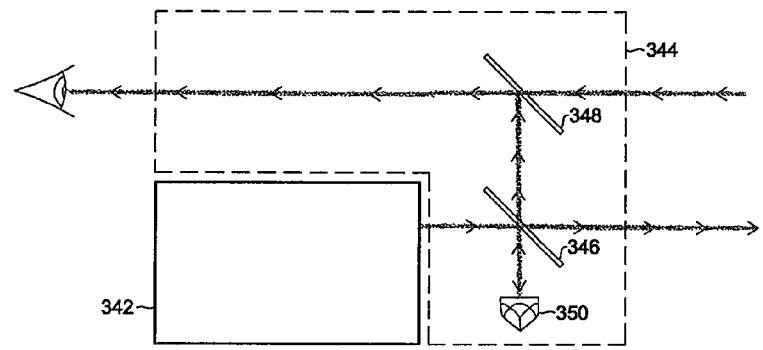

With reference particularly to FIG. 3B, a system 320 is illustrated which comprises a laser rangefinder 322 in conjunction with an external self-aligned aiming system 324 which may be mounted externally to the laser rangefinder 322. The self-aligned aiming system 324 comprises a glass element 326 and a parallel disposed glass element 328. A retroreflector 330 is associated with the glass element 328 for providing a virtual dot in a viewing window that introduces a small aiming parallax to a viewer. It should be noted that the glass elements 326 and 328 should be parallel to within 0.5 milliradians or less.

With reference particularly to Hg. 3C, a system 340 is illustrated which comprises a laser rangefinder 342 in conjunction with an external self-aligned aiming system 344 which may be mounted externally to the laser rangefinder 342. The self-aligned aiming system 344 comprises a glass element 346 and a parallel disposed glass element 348. A retroreflector 350 is associated with the glass element 346 for providing a virtual dot in a viewing window that also introduces a small aiming parallax to a viewer. Again, it should be noted that the glass elements 346 and 348 should be parallel to within 0.5 milliradians or less.

Figure 3D:
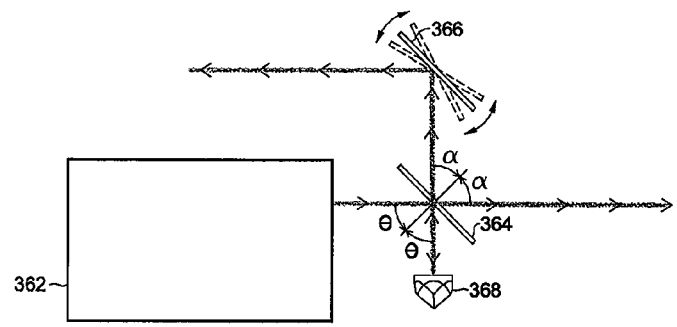

With particular reference to FIG. 3D, a self-aligned aiming system 360 is shown in conjunction with a laser rangefinder 362 comprising a glass element or partially transmissive (e.g. dichroic) mirror 364, adjustable mirror 366 and a retroreflector 368. In this illustration it can be seen that visual parallax can be substantially eliminated if the angle α is set equal to the angle θ and the mirror 366 is adjusted to be parallel to the dichroic mirror 364. It should be noted that if the angle α is not equal to the angle θ there will be some visual parallax; however, along the visual pathway the virtual dot will nevertheless be aligned with the dot on the target.

Figure 3E:
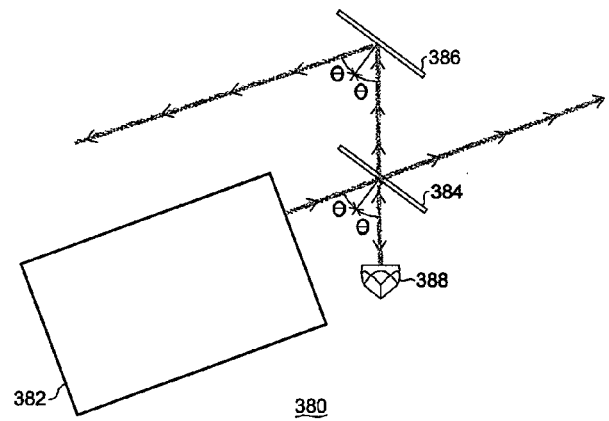

With particular reference to FIG. 3E, a self-aligned aiming system 380 is shown indicative of the fact that the system 380 comprising elements 384, 386 and retroreflector 388 can be configured at any angle to a laser rangefinder 382 and still provide self-alignment of the virtual dot in a viewing window to the visible laser beam emitted by the laser rangefinder.

Figure 4A:
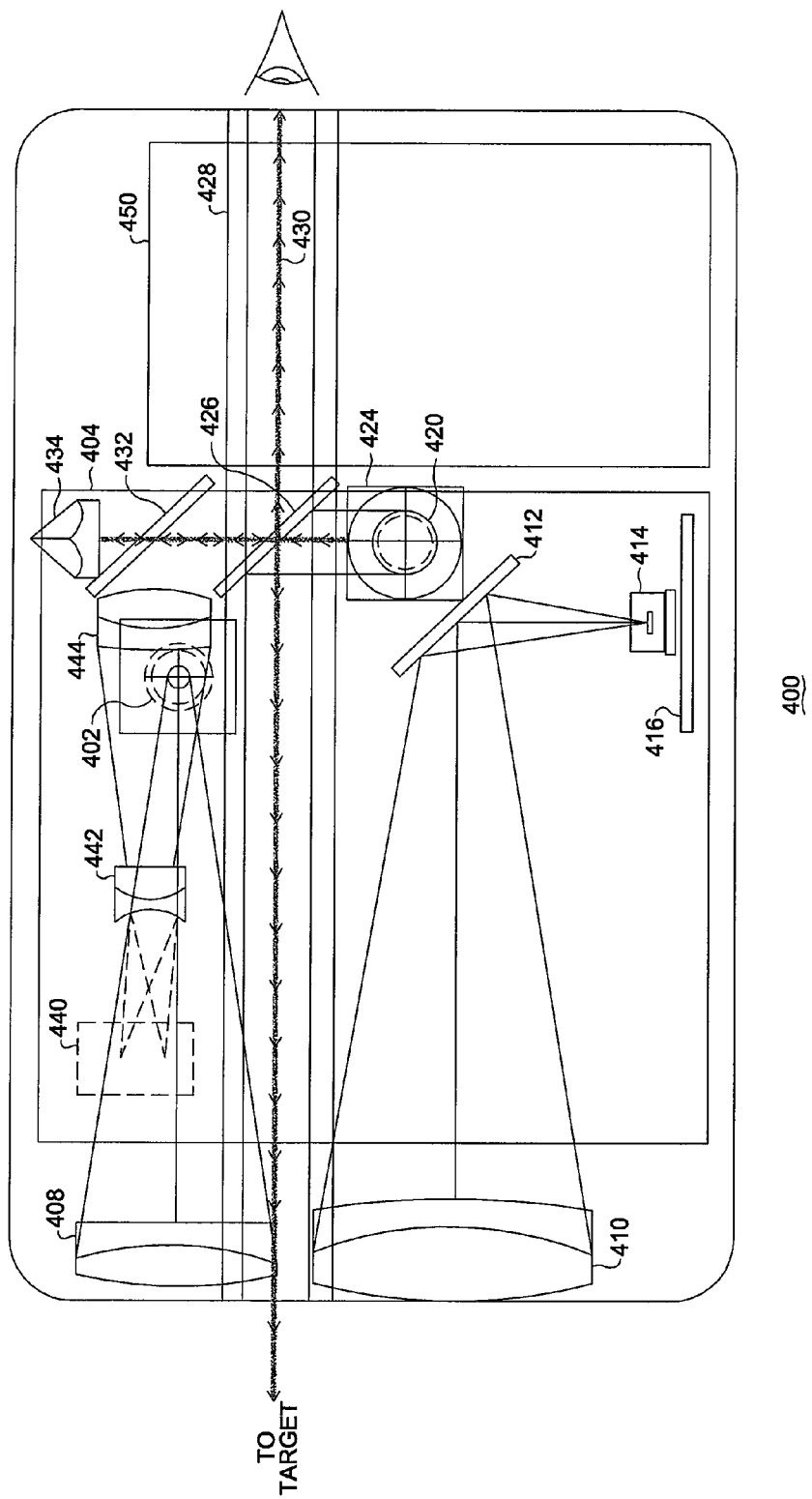
FIGS. 4A through 4C inclusively are respectively top plan, side elevational and rear views of an alternative embodiment of the present invention which obviates any visual parallax between a visible beam directed toward a target and the corresponding virtual dot viewed by a user in a view port of the instrument.
Figure 4B:
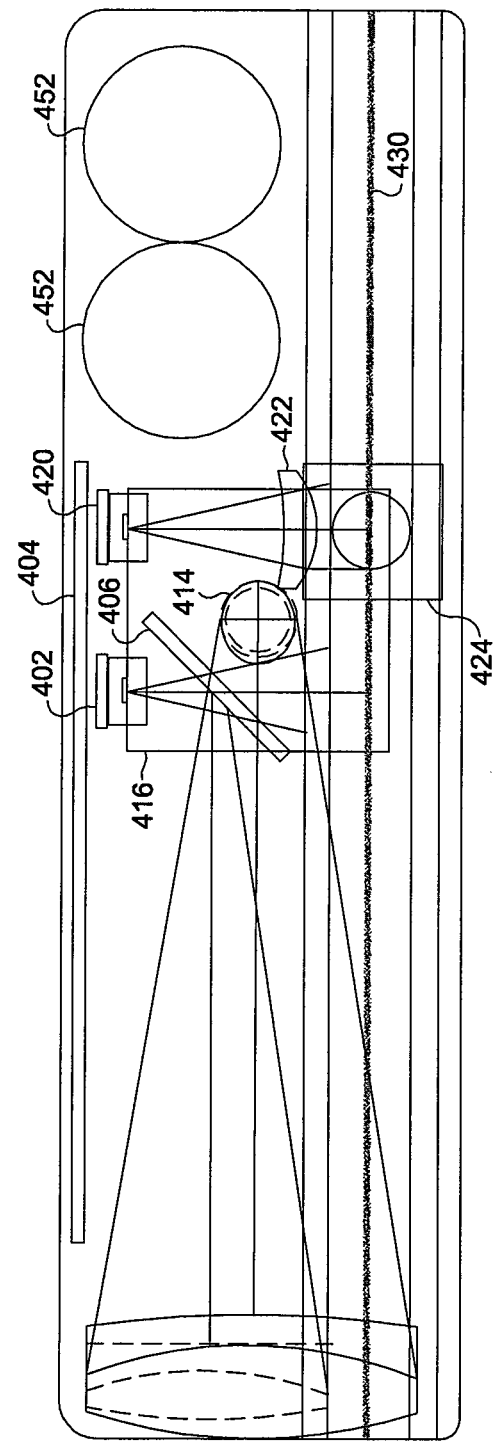
Figure 4C:
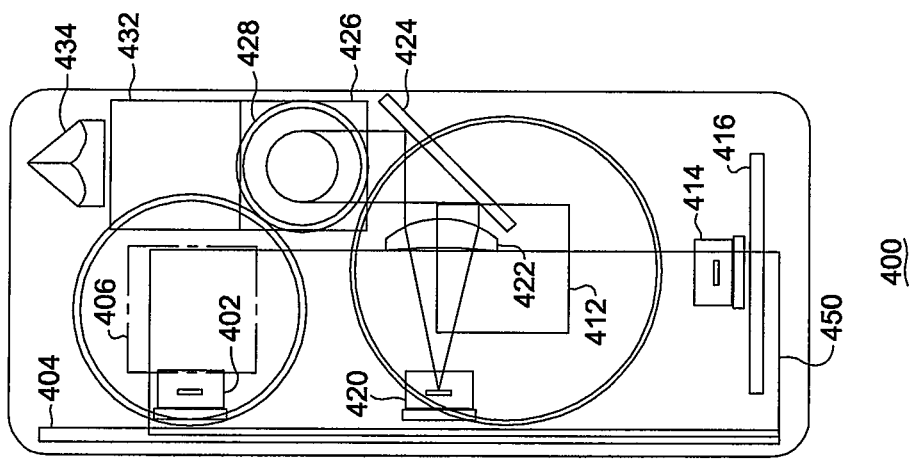

With reference additionally now to FIGS. 4A through 4C inclusive respective top plan, side elevational and rear views of an alternative embodiment of the present invention are presented. The laser rangefinder (or distance measuring device) 400 illustrated obviates any visual parallax between a visible beam directed toward a target and the corresponding virtual dot viewed by a user in a view port of the laser rangefinder 400. The laser rangefinder 400 illustrated comprises a laser emitting diode 402 for producing a pulsed laser beam which is directable to a target for determining the distance thereto by computing the flight time of the pulses to, and reflected from, the target. The laser emitting diode 402 is mounted to a circuit board 404 and the laser beam emitted from the laser emitting diode 402 is then redirected by a mirror 406 through a focusing lens 408 at a laser transmission aperture of the laser rangefinder 400.

Laser energy reflected from the target is then received back at the laser rangefinder 400 in the form of returned laser energy which is focused through lens system 410 toward another mirror 412 to a laser detector 414 mounted on a separate circuit board 416 disposed at right angles to circuit board 404.

In accordance with this additional embodiment of the present invention, the laser rangefinder 400 also incorporates a target designating visible laser source 420 to enable accurate pointing of the laser beam emitted by the laser emitting diode 402 toward a desired target. The visible laser source 420 produces a visible laser beam which passes through a focusing lens 422 impinges upon, and is redirected by, a mirror 424. Mirror 424 then redirects the visible laser beam to partial (e.g. dichroic) mirror 426. A significant portion of the visible laser beam 40 is reflected by the dichroic mirror 426 (e.g. substantially 90% or greater) toward the target while a smaller portion of the visible laser beam passes through the dichroic mirror 426 (e.g. substantially 10% or less) towards a retroreflector 434 through a display mirror 432 which may be substantially 50% transmissive and 50% reflective. It should be noted that in other embodiments of the present invention the display mirror 432 may be substantially 70% reflective and 30% transmissive. In this manner, a virtual dot is presented to the user of the laser rangefinder 400 through a straight-through viewing tube 428 along pathway 430 which is directly coincident with the visible laser beam which is directed toward the target thereby presenting no visual offset between the two and obviating any visual parallax.

The laser rangefinder 400 may also incorporate an illuminated visual display 440, the visual output of which passes through a lens system 442, 444 for interaction with display mirror 432 to further provide distance and other information as well to a user of the laser rangefinder 400 along pathway 430. In other embodiments of the present invention, the display 440 may additionally be made directly viewable through a window (not shown) provided in the laser rangefinder 400 housing, for example, when utilized as a laser tape measure. In another particular embodiment of the laser rangefinder 400, a battery compartment 450 may be provided into which a pair of AA batteries 452 may be inserted to provide operational power for the laser rangefinder 400.

While there have been described above the principles of the present invention in conjunction with specific apparatus it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. An aiming system for a laser rangefinder comprising:
   a visible laser beam source;
   a partial mirror for allowing a first portion of said visible laser beam to pass through said partial mirror toward a target and directing a second portion of said visible laser beam toward a retroreflector, said retroreflector redirecting said second portion of said visible laser beam back through said partial mirror; and
   at least one visible laser beam redirecting element for redirecting said second portion of said visible laser beam received from said retroreflector toward a viewing window of said laser rangefinder as a virtual dot.

2. The aiming system of claim 1 wherein said retroreflector is mounted internally to said laser rangefinder.

3. The aiming system of claim 1 wherein said retroreflector is mounted externally to said laser rangefinder.

4. The aiming system of claim 1 wherein said visible laser beam redirecting element comprises a partial mirror.

5. The aiming system of claim 1 wherein said partial mirror is positioned in a viewing tube of said laser rangefinder.

6. The aiming system of claim 5 wherein said viewing tube is substantially straight.

7. The aiming system of claim 1 further comprising:
   a display for presenting information representing a distance to said target to said user in conjunction with said virtual dot.

8. An aiming system for a distance measuring apparatus comprising:
   a visible laser beam source for producing a visible laser beam; and
   a partial mirror having a first surface thereof for directing a first portion of said visible laser beam toward said target and a second portion of said visible laser beam toward a user as a virtual dot viewable with said target in a view port of said apparatus,
   wherein said second portion of said visible laser beam is directed toward a retroreflector for redirection through a second opposite surface of said partial mirror for further redirection toward said user as said virtual dot.

9. A laser-based rangefinding instrument comprising:
   a laser transmitting section for directing a distance measuring beam toward a target;
   a laser receiving section for receiving laser energy reflected from said target in response to said measuring laser beam;
   a processor for determining a distance to said target based upon a time of flight of said distance measuring laser beam to said target;
   a visible laser beam source for producing a visible laser beam;
   a partial mirror for allowing a first portion of said visible laser beam to pass through said partial mirror toward said target and directing a second portion of said visible laser beam toward a retroreflector for redirection back through said partial mirror toward a view port of said instrument viewable as a virtual dot with a view of said target by a user of said instrument.

10. The rangefinding instrument of claim 9 wherein said instrument is contained within a hand-holdable housing.

11. The rangefinding instrument of claim 9 wherein said first portion of said visible laser beam is at least partially coaxial with said distance measuring beam.

12. The rangefinding instrument of claim 9 further comprising:
   a numeric display of said determined distance to said target viewable with said virtual dot and said target in said view port of said instrument.

13. The aiming system of claim 4 wherein said partial mirror and said mirror present a view of said target in said viewing window in conjunction with said second portion of said visible laser beam.

14. The aiming system of claim 1 wherein said first portion of said visible laser beam is substantially 90% of said visible laser beam and said second portion of said visible laser beam is substantially 10% of said visible laser beam.

* * * * *

UNITED STATES PATENT AND TRADEMARK OFFICE
CERTIFICATE OF CORRECTION

| | | |
|---|---|---|
| PATENT NO. | : 9,213,101 B2 | Page 1 of 1 |
| APPLICATION NO. | : 13/615215 | |
| DATED | : December 15, 2015 | |
| INVENTOR(S) | : Jeremy G. Dunne | |

It is certified that error appears in the above-identified patent and that said Letters Patent is hereby corrected as shown below:

IN THE CLAIMS

Column 7, line 50, delete "partial"

Signed and Sealed this
Ninth Day of February, 2016

Michelle K. Lee
*Director of the United States Patent and Trademark Office*